United States Patent [19]

Ginell

[11] Patent Number: 4,824,276
[45] Date of Patent: Apr. 25, 1989

[54] HELIX COUPLING

[75] Inventor: William S. Ginell, Encino, Calif.

[73] Assignee: The United States of America as represented by the United States Department of Energy, Washington, D.C.

[21] Appl. No.: 359,973

[22] Filed: Mar. 19, 1982

[51] Int. Cl.⁴ .................. F16G 15/64; F03G 7/06; F16B 4/00
[52] U.S. Cl. .................................... 403/213; 403/28; 403/404; 60/529
[58] Field of Search ............ 403/209, 213, 206, 405.1, 403/404, 28; 59/83, 79.1; 60/527, 529; 152/217, 218, 219, 243; 267/166

[56] References Cited

U.S. PATENT DOCUMENTS

| 474,845 | 5/1892 | Mayell . | |
|---|---|---|---|
| 1,456,181 | 5/1923 | Evans | 152/243 |
| 3,913,326 | 10/1970 | Banks . | |
| 4,010,455 | 3/1977 | Stange . | |
| 4,027,479 | 6/1977 | Cory . | |
| 4,037,411 | 7/1977 | Hochstein . | |
| 4,055,955 | 11/1977 | Johnson . | |
| 4,076,433 | 2/1978 | Halopoff | 411/389 X |
| 4,086,769 | 5/1978 | Smith . | |
| 4,216,811 | 8/1980 | Gray | 152/243 X |
| 4,231,223 | 11/1980 | Pringle et al. . | |
| 4,281,513 | 8/1981 | Johnson et al. . | |

Primary Examiner—Randolph A. Reese
Assistant Examiner—Peter M. Cuomo
Attorney, Agent, or Firm—L. E. Carnahan; Roger S. Gaither; Judson R. Hightower

[57] ABSTRACT

A coupling for connecting helix members in series, which consists of a pair of U-shaped elements, one of which is attached to each helix end with the "U" sections of the elements interlocked. The coupling is particularly beneficial for interconnecting helical Nitinol elements utilized in thermal actuators or engines. Each coupling half is attached to the associated helix at two points, thereby providing axial load while being easily removed from the helix, and reusable.

9 Claims, 1 Drawing Sheet

HELIX COUPLING

BACKGROUND OF THE INVENTION

The invention described herein arose under Contract No. DE-AC05-780R06028 between McDonnell Douglas Corporation and the U.S. Department of Energy.

The invention relates to a helix coupling particularly to a helix coupling utilizing a pair of U-shaped members—and, more particularly, to such a coupling for interconnecting helical Nitinol elements in series.

Various types of energy conversion systems are currently being actively developed in a view of the energy shortage. Among these systems are thermal engine-driven apparatus exemplified by low-temperature heat engines utilizing thermally responsive elements made of the so-called "memory" alloy material, such as nickel-titanium (Nitinol). Memory alloy material, such as Nitinol, has the remarkable property of undergoing plastic deformation from a memory shape to a trained shape when cooled and then deforming back to the memory shape when warmed while exerting a greater force than the deforming force during cooling.

Various low-temperture heat engines utilizing the memory alloys have been proposed. These prior engines are exemplified by U.S. Pat. No. 3,913,326, issued Oct. 21, 1975, to R. M. Banks; No. 4,027,479 issued June 7, 1977 to J. S. Cory; No. 4,037,411, issued July 26, 1977, to P. A. Hochstein; No. 4,010,455, issued Mar. 1, 1977, to W. C. Stange; No. 4,055,955, issued Nov. 1, 1977, to A. D. Johnson; No. 4,086,769, issued May 2, 1978, to W. K. Smith; and No. 4,231,223, issued Nov. 4, 1980, to W. L. Pringle. These prior art approaches have utilized various-shaped memory elements, including curved and helical configurations.

Various low-temperature heat engine designs have been proposed in an attempt to overcome the problems of limited output and complexity of previous shaped memory engines. Such an engine is exemplified by U.S. Pat. No. 4,281,513, issued Aug. 4, 1981, to A. D. Johnson, which utilizes a plurality of helical Nitinol elements connected in series.

Typically, Nitinol elements are brought into contact with a heat source and a heat sink, alternately. The elements are stretched mechanically when cold and contract spontaneously when hot. Net work is produced because less work is required to stretch the elements than is produced during contraction; the net work arises by conversion of thermal energy from the heat source.

With engines such as illustrated in abovereferenced U.S. Pat. No. 4,281,513, the Nitinol elements are close-wound helixes, and the ends of each helix are required to be joined together by a coupling to form a continuous band. Previous coupling designs, for example, utilized rigid brass or steel tubing sections into which the two helix ends were inserted. The tubing was secured to the helix by swaging or crimping, usually over a notch in the Nitinol wire. It has been found that upon cycling this type of coupled element $10^3$ to $10^4$ cycles) through a temperature differential, fatigue failure of the Nitinol wire occurred at or close to the crimped-on couplings. Tests have revealed that the number of cycles to fatigue failure were related to the strain extend during cycling. Apparently, the strain in the coupling region was excessive and failure occurred.

Thus, while there are various approaches to heat engines utilizing Nitinol elements, for example, there is a need for an effective way of coupling together elements so as to reduce the problems of fatigue failure.

Therefore, it is an object of this invention to provide a coupling for memory alloy elements of a heat engine.

A further object of the invention is to provide a coupling for series connected helical members.

Another object of the invention is to provide a coupling for series-connected helixes which utilize a pair of interlocked U-shaped members.

Another object of the invention is to provide a coupling for series-connected Nitinol elements which substantially reduces fatigue failure of the elements due to the coupling.

Another object of the invention is to provide a coupling for series-connected helical memory alloy elements utilizing a pair of U-shaped members which are interlocked at the "U" section thereof, and which are connected to each helical element at two points, thereby providing axial loading.

Other objects and advantages of the invention will become readily apparent from the following description and accompanying drawings.

SUMMARY OF THE INVENTION

The present invention accomplishes the objectives set forth above by providing a coupling for helical members wherein: (1) the helix ends are allowed some freedom to rotate about the helix axis; (2) there are no rigid metallic attachments; (3) axial loading is provided by a two-point attachment; (4) the strain extent in the coupling region during cycling is not greater than elsewhere in the member; (5) the ends are maintained in alignment and the coupling region can pass over a small radius roller, or pulley; and (6) the coupling is easily and inexpensively fabricated, and reusable.

The coupling of this invention consists of two identical U-shaped units, one of which is attached to each helix end, with the U-shaped units being interlocked at the "U" portions thereof. Each U-shaped unit has one leg longer than the other leg and is provided with loops or openings at the ends of each of the unequal legs. The end of a helix is threaded into the two end loops whereby the U-shaped unit is in contact with the helix at two points, which provides axial loading. The end of the helix, after being threaded through the loops of the U-shaped member, is provided with a collar, or is appropriately crimped, to prevent it from threading back through the loops during operation.

The U-shaped members are readily formed by shaping or winding a metal wire on a three-pin jig plate, with the pins spaced to provide the desired length of each leg. The diameter of the pins determines the curvature of the "U" portion and the diameter of the openings or loops at the end of the legs.

DETAILED DESCRIPTION OF THE INVENTIONS

The present invention is directed to a coupling for helical members, and is particularly adapted for use with helix memory alloy members utilized in lowtemperature heat engines. Such memory alloys may be Nitinol (nickel-titanium), CuAlNi, CuZn, CuAlZn, FePt, AuCd, or any other alloy that exhibits shape-memory properties. The coupling basically consists of a pair of U-shaped units, each unit having one longer leg. The legs of the U-shaped units are provided with end loops or openings through which an associated helix is threaded, with the "U" sections of the units being interlocked to couple the helix members together. To prevent unthreading of the units, the end of each helix is provided with a collar, or the like, secured such as by crimping.

Figure 1:
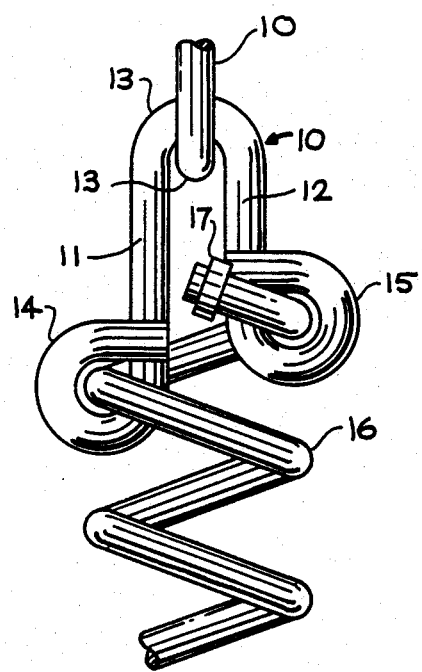
FIG. 1 illustrates a helix coupling utilizing U-shaped units in accordance with the invention.

Referring now to FIG. 1, the coupling embodiment illustrated consists of a pair of identical coupling halves, each half consisting of a U-shaped unit 10, only one unit fully shown. Each coupling half or unit 10 consists of a pair of legs 11 and 12 interconnected at a U-section 13, leg 11 being of greater length than leg 12. Legs 11 and 12 are provided with end loops or openings 14 and 15, respectively. A helix 16 is threaded through the end loops 14 and 15 of unit 10, and a collar 17 (constructed of stainless steel or nickel, for example) is crimped or otherwise secured on the end of helix 16 to prevent the helix from threading back through the end loops. As shown, the U-sections 13 of units 10 are interlocked, it being understood that a similar helix is secured in the same manner to the other of the pair of U-shaped units. Also, while not shown, a series of helixes may be connected by utilizing pairs of U-shaped units for coupling each adjacent pair of helixes.

By way of example, the U-shaped units, when utilized to couple helixes of memory alloys such as Nitinol (NiTi), may be formed of stainless steel, inconel, nickel, or similar corrosion-resistant wire. Also, some embodiments of the U-shaped units may be made of material that also is spot-weldable, as well as being corrosion resistant. For coupling Nitinol close-wound helixes of 0.105 inch diameter made from 0.020 inch diameter wire, the U-shaped units are formed from 0.010 inch diameter wire with the end loops or openings having diameters slightly larger than 0.020 inch diameter to allow some freedom of the helix when threaded therethrough. The length of the legs of the U-shaped units are determined by the distance between the individual turns of the helix to which it is to be coupled so that the helix is readily threaded through the end loops in the legs of the U-shaped units. This provides a twopoint contact between the helix and the coupling half or U-shaped unit while allowing some degree of rotational freedom of the helix. For example, in the abovedescribed embodiment, the legs 11 and 12 have a length of 0.142 inches and 0.106 inches, respectively, from the center of the U-section 13 to the end of the legs.

Figure 2:
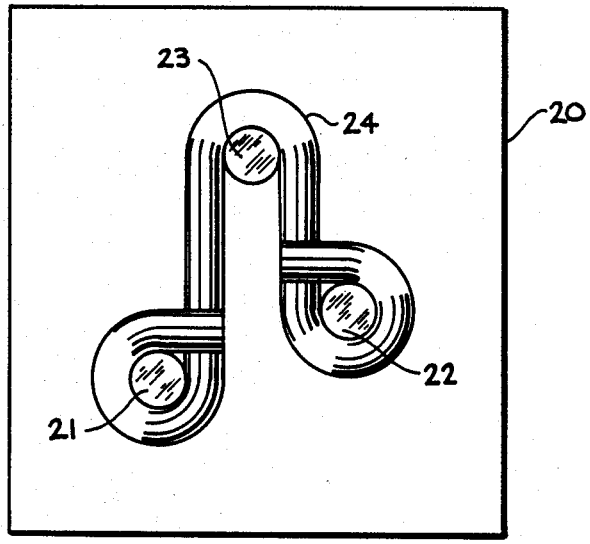
FIG. 2 illustrates a couplng unit-forming jig.

The U-shaped units are easily formed, as described with reference to the forming jig of FIG. 2 which consists of a jig plate 20 and three spaced pins 21, 22 and 23 secured to the jig plate. The jig pins, in this embodiment, are constructed of 0.020 inch diameter spring steel with the jig plate being constructed of aluminum. The spacing of pins 21, 22 and 23 is dependent upon the helix pitch and diameter, and the diameter of the pins depends on the diameter of the helix material. It is readily seen that an increase or decrease in the diameter of pins 21-23 will change the curvature of the "U" section and the diameter of the end openings or loops. After the U-shaped unit is formed by wrapping appropriate diameter wire 24 around the jig pins 21-23, as illustrated in FIG. 2, the thus formed unit is removed from the jig and the lap joints forming the leg end loops are spot welded, for example. The completed U-shaped units are interlocked at the "U" sections thereof and the leg and loops threaded onto an associated helix, whereafter the collar is secured to the free end of the helix, as by crimping. It is recognized that the leg and loops or opening can be formed by other methods, such as by flattening the wire and drilling holes therein. Also, the U-shaped units can be formed by stamping the unit from a sheet of corrosion-resistant metal and forming holes in the end of the legs.

The coupling described above, and exemplified by the embodiment illustrated in FIG. 1 for use with Nitinol helical elements, provides the following advantages:

1. Helix ends are allowed some freedom to rotate about the helix axis.
2. No rigid metallic attachments to the helix.
3. Helix ends maintained in alignment.
4. Helix coupling region can pass over a small radius roller or pulley.
5. Minimum number of helix turns inactive.
6. Strain extent in the coupling region during cycling no greater than elsewhere in the helix element.
7. Corrosion resistant, low cost, easily fabricated, and reusable.
8. Long life, greater than $2.4 \times 10^5$ cycles.
9. Will not unscrew from helix.

The helix coupling of this invention, while having specific application for connecting helical Nitinol elements of low-temperature heat engines, can be used to join the ends of all types of helical members where flexibility and relative motion of the helix ends are important. In addition to the advantages of the coupling set forth above, it should also be noted that: (1) each coupling half is attached to the helix at two points, thereby providing axial loading; (2) coupling halves are formed from readily available wire rather than precision-drawn or specially designed material; and (3) the couplings are easily removed from the helix.

It has thus been shown that the present invention provides a coupling for helical members which overcomes the problems of the prior known coupling, particularly in the field of low-temperature heat engines utilizing series-connected memory alloy elements of helical configuration.

While a particular embodiment of the invention has been illustrated and described, modifications and changes will become apparent to those skilled in the art, and it is intended to cover in the appended claims all such modifications and changes as come within the spirit and scope of the invention.

What I claim is:

1. A coupling for helical members comprising: a pair of similarily constructed U-shaped units each having a pair of leg members interconnected by a "U" section, said leg members being of different lengths and provided with openings at the ends thereof; said pair of U-shaped units being interlocked directly to each other by said "U" sections thereof, and each unit being adapted to be connected to associated helical members by inserting an end of such an associated helical member through said openings in said leg members of said U-shaped units.

2. A coupling for connecting in series a plurality of helical elements constructed of a memory alloy, said coupling consisting of two similarly constructed halves, each of said halves having a U-shaped configuration with one leg thereof being of a greater length than another leg thereof, each of said legs being provided with an opening in the outer end thereof, said two halves of said coupling being directly interlocked at a "U" section of said U-shaped configuration, an end of one of said plurality of helical elements being threaded through said openings in said legs of one of said halves and another of said plurality of helical elements being threaded through said openings in said legs of the other of said halves, and means secured to said helical elements for preventing same from passing back through said openings in said legs.

3. The coupling of claim 2, wherein said U-shaped-configured halves are constructed of material selected from the group consisting of stainless steel, inconel and nickel, and wherein said helical elements are constructed of material selected from the group consisting of NiTi, CuAlNi, CuZn, CuAlZn, FePt, AuCd and other shape-memory alloys.

4. The couplings of claim 2, wherein said U-shaped configured halves are constructed of corrosion-resistant, spot-weldable metal alloys.

5. The coupling of claim 2, wherein said means consists of a collar secured to a free end of a helical element.

6. The coupling of claim 2, wherein said U-shaped halves are each constructed of stainless steel wire having a 0.010 inch diameter, and wherein said helical elements are each constructed of Nitinol wire having a 0.020 inch diameter.

7. The coupling of claim 2, wherein said openings in said outer end of each leg of said U-shaped half consists of a loop formed in the end of said leg.

8. THe coupling of claim 2, wherein each of said U-shaped halves is formed by wrapping a wire of selected material about three spaced pins so as to define said legs interconnected by said "U" section, and wherein said openings in said legs consist of lapped loops of wire.

9. The coupling of claim 2, wherein each of said U-shaped halves is formed by stamping each half from a sheet of corrosion-resistant metal, and forming an opening in the ends of each leg of said U-shaped halves.

* * * * *